US011070735B2

(12) United States Patent
Koyama et al.

(10) Patent No.: US 11,070,735 B2
(45) Date of Patent: Jul. 20, 2021

(54) PHOTOGRAPHING DEVICE, PHOTOGRAPHING SYSTEM, MOBILE BODY, CONTROL METHOD AND PROGRAM

(71) Applicant: SZ DJI TECHNOLOGY CO., LTD., Shenzhen (CN)

(72) Inventors: Takashi Koyama, Shenzhen (CN); Naoyuki Ohno, Shenzhen (CN); Kenichi Honjo, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/728,709

(22) Filed: Dec. 27, 2019

(65) Prior Publication Data
US 2020/0137312 A1 Apr. 30, 2020

Related U.S. Application Data

(63) Continuation of application No. PCT/CN2017/114803, filed on Dec. 6, 2017.

(30) Foreign Application Priority Data

Jun. 29, 2017 (JP) .............................. JP2017-127529

(51) Int. Cl.
*H04N 5/232* (2006.01)
*B64D 47/08* (2006.01)
(Continued)

(52) U.S. Cl.
CPC ......... *H04N 5/23296* (2013.01); *B64D 47/08* (2013.01); *G03B 13/32* (2013.01); *G03B 17/14* (2013.01); *H04N 5/23212* (2013.01)

(58) Field of Classification Search
CPC .......... H04N 5/23296; H04N 5/23212; H04N 5/232; H04N 5/2254; H04N 5/2253;
(Continued)

(56) References Cited

U.S. PATENT DOCUMENTS

2013/0051780 A1* 2/2013 Takahata ................ G03B 17/14
396/85
2015/0195448 A1* 7/2015 Endo .................. G02B 13/0015
348/349
(Continued)

FOREIGN PATENT DOCUMENTS

CN 102147521 A 8/2011
CN 102404506 A 4/2012
(Continued)

OTHER PUBLICATIONS

The World Intellectual Property Organization (WIPO) International Search Report for PCT/CN2017/114803 dated Mar. 23, 2018 10 pages.

*Primary Examiner* — Jared Walker
(74) *Attorney, Agent, or Firm* — Anova Law Group, PLLC

(57) ABSTRACT

The present disclosure provides a control device for controlling an imaging device. The control device includes an operation unit configured to be operated by an external force; a detection unit configured to detect an operation state of the operation unit; a processor configured to execute a program to: perform a predetermined operation based on the operation state of the operation unit; and invalidate an execution of the predetermined operation performed by the processor based on the operation state of the operation unit when the imaging device is connected to an object satisfying a condition.

18 Claims, 6 Drawing Sheets

(51) Int. Cl.
*G03B 17/14* (2021.01)
*G03B 13/32* (2021.01)

(58) Field of Classification Search
CPC ...... H04N 5/2328; B64D 47/08; G03B 13/32; G03B 17/14; G03B 17/561; G03B 15/006; B64C 2201/127; B64C 2201/123; B64C 39/024; F16M 2200/041; F16M 2200/044; F16M 11/128; F16M 13/02; F16M 11/18; F16M 11/10
See application file for complete search history.

(56) References Cited

U.S. PATENT DOCUMENTS

2016/0353001 A1* 12/2016 Yu ........................... B64D 47/08
2017/0293297 A1* 10/2017 Kim ...................... B64D 43/00

FOREIGN PATENT DOCUMENTS

| CN | 106101564 A | 11/2016 |
| CN | 106161919 A | 11/2016 |
| JP | 2006345164 A | 12/2006 |
| JP | 2013050510 A | 3/2013 |
| JP | 2017013767 A | 1/2017 |

* cited by examiner

PHOTOGRAPHING DEVICE, PHOTOGRAPHING SYSTEM, MOBILE BODY, CONTROL METHOD AND PROGRAM

CROSS-REFERENCE TO RELATED APPLICATION

This application is a continuation of International Application No. PCT/CN2017/114803, filed on Dec. 6, 2017, which in turn claims priority to Japanese Patent Application No. 2017-127529, filed on Jun. 29, 2017. The entire content of the two applications is incorporated herein by reference.

TECHNICAL FIELD

The present disclosure relates to an imaging device, an imaging system, a mobile object, a control method, and a program.

BACKGROUND

JP 2013-50510 discloses a camera that can use a detector to detect an amount of rotation and a direction of rotation of a rotation frame rotated by a manual operation, such that the lens can move in the optical axis direction based on the detected amount of rotation and the direction of rotation.

In an imaging device that performs a predetermined operation such as a focusing operation based on an operation state of an operation unit, such as the rotation frame that is manually operated, the operation unit may be inadvertently operated due to the vibration of the imaging device or the like.

SUMMARY

One aspect of the present disclosure provides a control device for controlling an imaging device. The control device includes an operation unit configured to be operated by an external force; a detection unit configured to detect an operation state of the operation unit; and a processor configured to execute a program to: perform a predetermined operation based on the operation state of the operation unit; and a invalidate an execution of the predetermined operation performed by the processor based on the operation state of the operation unit when the imaging device is connected to an object satisfying a condition.

Another aspect of the present disclosure provides an imaging device. The imaging device includes a control device. The control device includes an operation unit being operated by an external force; a detection unit configured to detect an operation state of the operation unit; a processor configured to execute a program to: perform a predetermined operation based on the operation state of the operation unit; and invalidate an execution of the predetermined operation performed by the processor based on the operation state of the operation unit when the imaging device is connected to an object satisfying a condition.

Another aspect of the present disclosure provides an imaging system. The imaging system includes an imaging device. The imaging device includes a control device and a support mechanism configured to rotatably support the imaging device. The control device includes an operation unit being operated by an external force; a detection unit configured to detect an operation state of the operation unit; a processor to execute a program to: perform a predetermined operation based on the operation state of the operation unit; and invalidate an execution of the predetermined operation performed by the processor based on the operation state of the operation unit when the imaging device is connected to an object satisfying a condition.

Another aspect of the present disclosure provides a mobile object movable corresponding to a movable imaging system. The movable imaging system having an imaging device. The imaging device includes a control device and a support mechanism configured to rotatably support the imaging device. The control device includes an operation unit being operated by an external force; a detection unit configured to detect an operation state of the operation unit; a processor configured to execute a program to: perform a predetermined operation based on the operation state of the operation unit; and invalidate an execution of the predetermined operation performed by the processor based on the operation state of the operation unit when the imaging device is connected to an object satisfying a condition.

Another aspect of the present disclosure provides a control method for controlling an imaging device. The imaging device includes an operation unit being operated by an external force; a detection unit configured to detect an operation state of the operation unit; a processor configured to execute a program to: perform a predetermined operation based on the operation state of the operation unit; and invalidate an execution of the predetermined operation performed by the processor based on the operation state of the operation unit when the imaging device is connected to an object satisfying a condition. The method includes invalidating the execution of the predetermined operation performed by the processor based on the operation state of the operation unit when the imaging device is connected to the object satisfying the condition.

In embodiments of the present disclosure, an imaging device that performs a predetermined operation based on an operation state of an operation unit would avoid problems caused by the operation unit be inadvertently operated due to the vibration of the imaging device. The descriptions of the features of the present disclosure are not exhaustive. Combinations or sub combinations of the described features form embodiments consistent with the present disclosure.

DETAILED DESCRIPTION OF THE EMBODIMENTS

Figure 1:
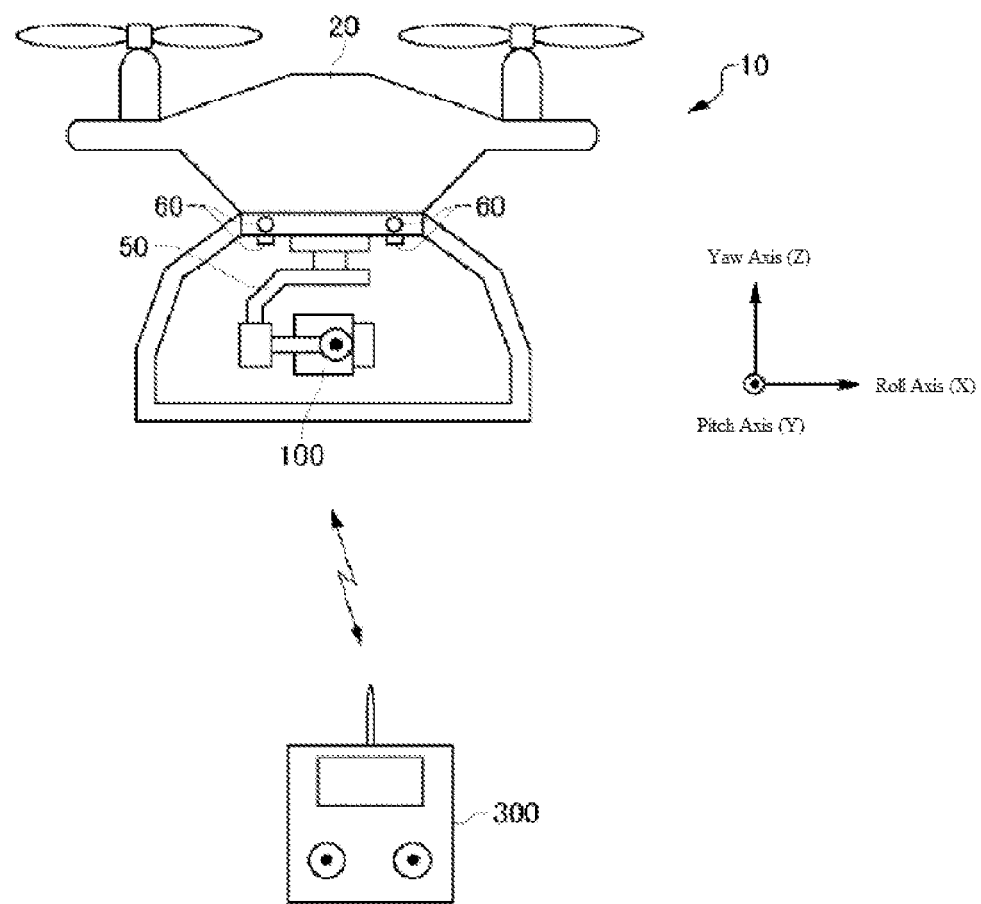
FIG. 1 is a diagram illustrating an example of an unmanned aerial vehicle (UAV) and a remote controller according to an embodiment of the present disclosure.

The technical solutions provided in the embodiments of the present disclosure will be described below with reference to the drawings. However, it should be understood that the following embodiments do not limit the disclosure. It will be appreciated that the described embodiments are some rather than all of the embodiments of the present disclosure. Other embodiments conceived by those having ordinary skills in the art on the basis of the described embodiments without inventive efforts should fall within the scope of the present disclosure. It should be noted that technical solutions provided in the present disclosure do not require all combinations of the features described in the embodiments of the present disclosure.

The various embodiments of the present disclosure can be described with reference to the accompanying flowcharts and block diagrams, and the blocks herein may represent (1) a state of a process of performing an operation, or (2) a part of a device having an effect of performing an operation. The specially designated stages and parts can be installed using programmable circuits and/or processors. Dedicated circuits may include digital and/or analog hardware circuits, which may include integrated circuits (ICs) and/or discrete circuits. The programmable circuit can include reconfigurable hardware circuitry, which can include logic AND, logic OR, logic XOR, logic NAND, login NOR, and other logic operations, flip-flops, registers, field programmable gate arrays (FPGAs), programmable logic arrays (PLAs), and the like.

The computer readable medium can include any tangible device that can store instructions that are executed by a suitable device. As such, a computer readable medium having instructions stored therein is provided with a product including executable instructions for forming means for performing the operations specified in the flowchart or block diagram. As an example, the computer readable medium may include an electronic storage medium, a magnetic storage medium, an optical storage medium, an electromagnetic storage medium, a semiconductor storage medium, or the like. As a more specific example, the computer readable medium may include a floppy (registered trademark) disk, a hard disk, a random access memory (RAM), a read only memory (ROM), an erasable programmable read only memory (EPROM or flash memory), electrically erasable programmable read only memory (EEPROM), static random access memory (SRAM), compact disc read only memory (CD-ROM), digital versatile disc (DVD), Blu-ray® disc, memory stick, integrated circuit card, and the like.

The computer readable instructions can include any of the source code or object code described in any combination of one or more programming languages. The source code or object code can include an existing procedural programming language. Existing procedural programming languages may be assembler instructions, instruction set architecture (ISA) instructions, machine instructions, machine dependent instructions, microcode, firmware instructions, state setting data, Smalltalk, JAVA (registered trademark), object-oriented programming language such as C++, and "C" programming language or the same programming language. The computer readable instructions may be provided locally or via a wide area network (WAN), such as a local area network (LAN), the Internet, to a processor or programmable circuit of a general purpose computer, special purpose computer, or other programmable data processing apparatus. The processor or programmable circuitry can execute computer readable instructions to form a means for performing the operations specified in the flowcharts or block diagrams. Examples of the processor include a computer processor, a processing unit, a microprocessor, a digital signal processor, a controller, a microcontroller, and the like.

FIG. 1 is a diagram illustrating an example of an unmanned aerial vehicle (UAV) 10 and a remote controller 300 according to an embodiment of the present disclosure.

The UAV 10 includes a UAV body 20, a gimbal 50, a plurality of imaging devices 60, and an imaging device 100. In some embodiments, the gimbal 50 and the imaging device 100 may be examples of an imaging system. The UAV 10 may be an example of a moving object propelled by a propulsion unit. In addition to the UAV, the moving object may include a flying object such as other aircraft moving in the air, a vehicle moving on the ground, a ship moving on the water, and the like.

The UAV body 20 includes a plurality of rotors. In some embodiments, the plurality of rotors may be an example of the propulsion unit. The UAV body 20 can cause the UAV 10 to fly by controlling the rotation of the plurality of rotors. For example, the UAV body 20 can use four rotors to cause the UAV 10 to fly. The number of the rotors is not limited to four. In addition, the UAV 10 can also be a rotor less fixed wing aircraft.

The imaging device 100 may be an imaging camera for acquiring images of an object included in a desired imaging range. The gimbal 50 may be used to support the imaging device 100 in a rotatable manner. In some embodiments, the gimbal 50 may be an example of a support mechanism. For example, the gimbal 50 can support the imaging device 100 by rotating around the pitch axis by using an actuator. Further, using the actuator, the gimbal 50 can support the imaging device 100 by rotating around the roll axis and the yaw axis, respectively. In some embodiments, the gimbal 50 can change the attitude of the imaging device 100 by rotating the imaging device 100 around at least one of the yaw axis, the pitch axis, and the roll axis.

The plurality of imaging devices 60 may be the sensing cameras that are configured to acquire images of the surroundings of the UAV 10 in order to control the flight of the UAV 10. In some embodiments, two imaging devices 60 may be disposed at the head of the UAV 10 (i.e., the front side), and two imaging devices 60 can be disposed at the bottom side of the UAV 10. The two imaging devices 60 on the front side may be paired and function as a so-called stereo camera. Similar, the two imaging devices 60 on the front side may be paired and function as a so-called stereo camera. In some embodiments, three-dimensional spatial data around the UAV 10 may be generated based on the images acquired by the plurality of imaging devices 60. In particular, the number of the imaging devices 60 disposed on the UAV 10 may not be limited to four. The UAV 10 may include at least one imaging device 60. In some embodiments, the UAV 10 may include at least one imaging device 60 at the head, the tail, the bottom side, and the top side of the UAV 10, respectively. In some embodiments, the configurable viewing angle of the imaging device 60 may be greater than the configurable viewing angle of the imaging device 100. Further, the imaging device 60 can also have a fixed focus lens or a fisheye lens.

The remote controller 300 may communicate with the UAV 10 to remotely operate the UAV 10. The remote controller 300 may communicate with the UAV in a wireless manner. The remote controller 300 may transmit instruction information indicating various commands related to the movement of the UAV 10, such as ascending, descending, accelerating, decelerating, forwarding, backing, and rotating of the UAV 10. The instruction information may include, for example, instruction information to cause the UAV 10 to increase the height of the UAV 10. In some embodiments, the instruction information may indicate the height at which the UAV should be at. As such, the UAV 10 may move to the height indicated by the instruction information received from the remote controller 300. Further, the instruction information may include an ascending instruction to cause the UAV 10 to ascend. As such, the UAV 10 may ascend while receiving the ascending instruction. In some embodiments, when the UAV 10 receives the ascending instruction, but the height of the UAV 10 has reached an ascending limit, the ascending may be limited.

Figure 2:
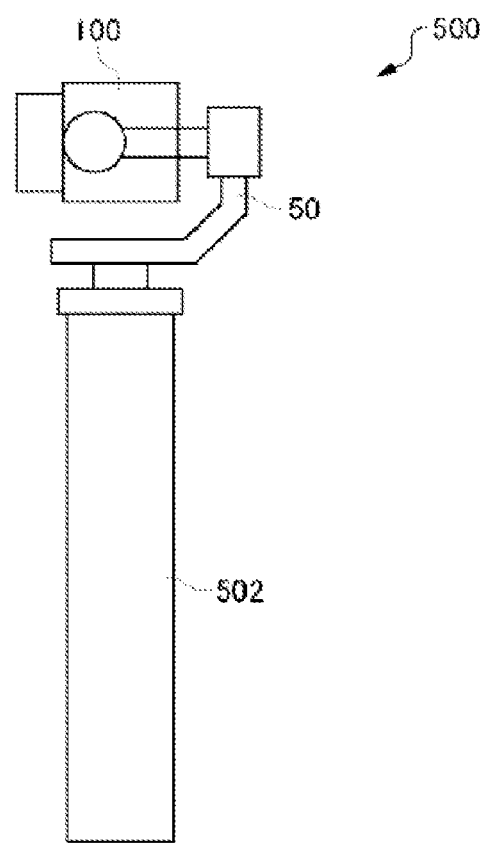
FIG. 2 is a diagram illustrating an example of a stabilizer according to an embodiment of the present disclosure.

FIG. 2 is a diagram illustrating an example of a stabilizer 500 according to an embodiment of the present disclosure. The stabilizer 500 includes a handheld unit 502, a gimbal 50, and an imaging device 100. The handheld unit 502 may include various buttons for operating the gimbal 50 and the imaging device 100. In some embodiments, the handheld unit 502 may include, for example, a shutter button, a recording button, and an operation button. In some embodiments, a still image may be recorded by the imaging device 100 by pressing the shutter button. Further, a moving picture may be recorded by the imaging device 100 by pressing the record button.

The imaging device 100 described above may be detachably mounted on an object (e.g., a moving object), such as the gimbal 50 and the UAV 10 and used. Further, the imaging device 100 may include a manually operated operation portion such as an operation ring for manually rotating the zoom operation or the focus operation.

Figure 3:
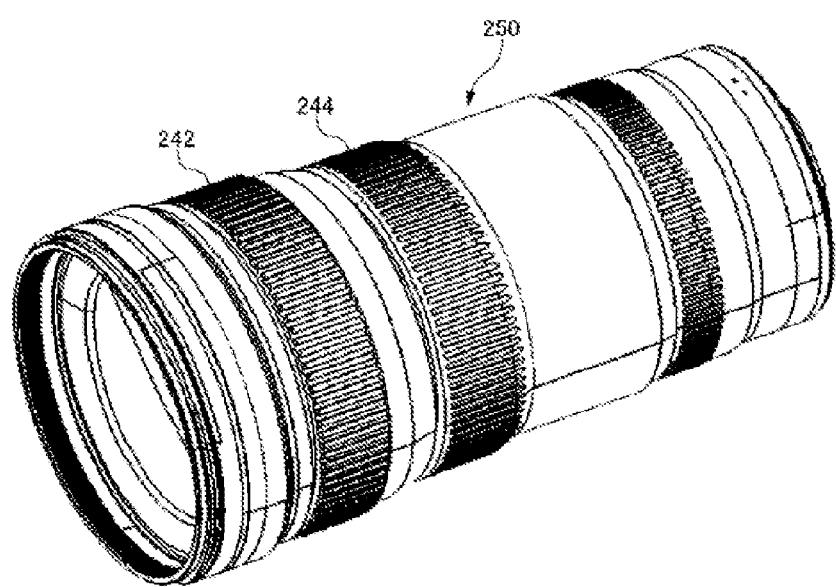
FIG. 3 is a diagram illustrating an example of a lens unit according to an embodiment of the present disclosure.

FIG. 3 is a diagram illustrating an example of an interchangeable lens 250 attached to the imaging device 100. The interchangeable lens 250 includes a focus operation ring 242 and a zoom operation ring 244 that may be rotatably disposed on an outer circumference of a lens barrel. The imaging device 100 may perform a focusing operation and a zooming operation based on an amount of rotation and a direction of rotation of the focus operation ring 242 and the zoom operation ring 242. The focus operation ring 242 and the zoom operation ring 244 may be examples of an operation unit that is operated by an external force, which may include a force applied from a hand of a person, a force applied from a drive mechanism by driving the drive mechanism by an electric motor, etc. In some embodiments, the focus operation ring 242 and the zoom operation ring 244 may be manually operated. In some embodiments, the focus operation ring 242 and the zoom operation ring 244 may be operated by rotating a transmission that is engaged with a gear disposed on the outer circumference of the focus operation ring 242 and the zoom operation ring 244 by an electric motor. The electric motor that rotates the transmission may be driven based on a drive instruction from an operation terminal such as the remote controller 300. In some embodiments, the operation unit may be an operation unit that operates manually directly or indirectly. An example of an indirectly manually operated operation unit may be as follow. Manually rotate the rotation ring disposed in the operation terminal such as the remote controller 300, and generate the drive instruction based on the amount of rotation and the direction of rotation of the rotation ring. Subsequently, the electric motor may cause the transmission to rotate, and the force generated by the transmission may be used to perform the operation.

Figure 4:
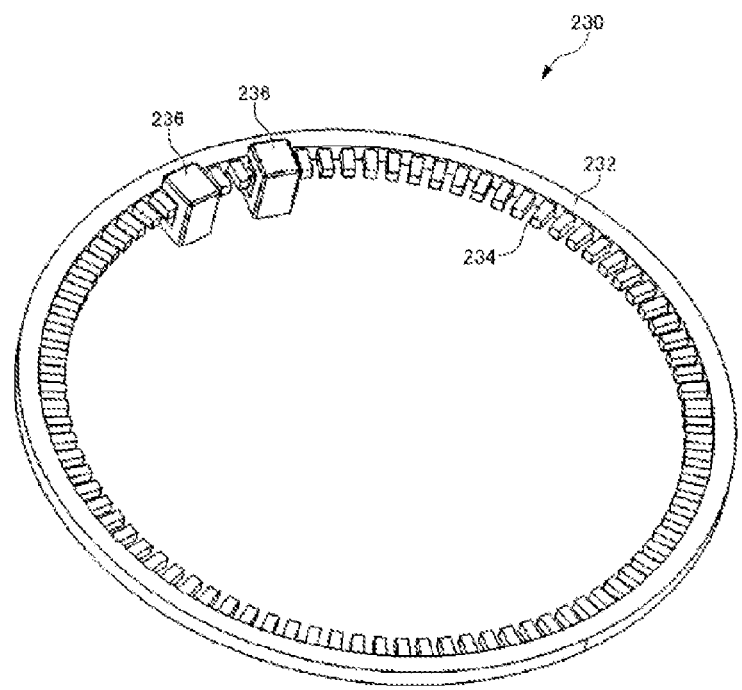
FIG. 4 is a diagram illustrating a detecting unit that detects an amount of rotation and a direction of rotation of an operation ring according to an embodiment of the present disclosure.

FIG. 4 is a diagram illustrating a detection unit 230 that detects an amount of rotation and a direction of rotation of the focus operation ring 242 and the zoom operation ring 244 according to an embodiment of the present disclosure. The detection unit 230 may be disposed inside the focus operation ring 242 or the zoom operation ring 244. The detection unit 230 includes an annular portion 232 and two photo interrupters 236. The annular portion 232 includes protrusions 234 that are disposed on the inner surface at equal intervals. With the rotation of the annular portion 232, the protrusions 234 may pass between a light-emitting portion and a light-receiving portion of the two photo interrupters 236. The light-receiving portion may receive the light emitted by the light-emitting portion. Each of the two photo interrupters 236 may output a detection signal indicating a light receiving pattern of the light in the light-receiving portion corresponding to a passing state of the protrusions 234. In some embodiments, the rotation amount and the rotation direction of the annular portion 232 may be specifically specified based on a combination of the light receiving patters of the two photo interrupters 236.

Figure 5:
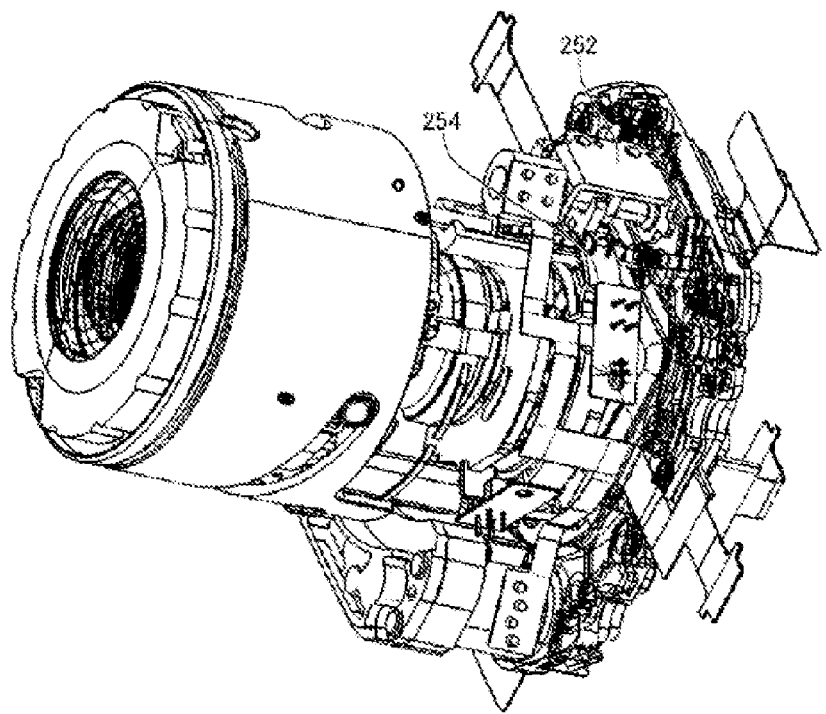
FIG. 5 is a diagram illustrating an example of an internal mechanism of an imaging device according to an embodiment of the present disclosure.
Figure 6:
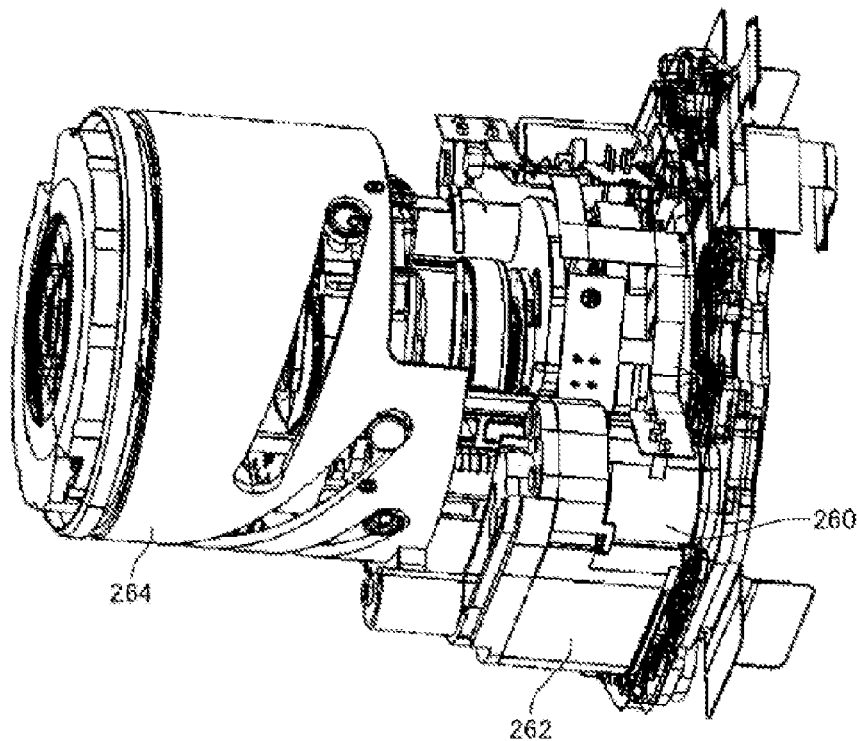
FIG. 6 is a diagram illustrating another example of an internal mechanism of an imaging device according to an embodiment of the present disclosure.

FIG. 5 and FIG. 6 are diagrams illustrating examples of an internal mechanism of the imaging device 100 according to an embodiment of the present disclosure. The imaging device 100 includes a focus lens unit 254 and a focus motor 252. A drive signal corresponding to the amount rotation and the direction of rotation of the focus operation ring 242 detected by the detection unit 230 may be provided to the focus motor 252. The focus motor 252 may drive the focus lens unit 254 based on the drive signal to perform a focusing operation. The imaging device 100 further includes a zoom motor 260 a speed reducer 262, and a cam ring 264. A drive signal corresponding to the amount rotation and the direction of rotation of the zoom operation ring 244 detected by the detection unit 230 may be provided to the zoom motor 260. The zoom motor 260 may rotate the cam ring 264 based on the focus lens unit 254 based on the drive signal. In some embodiments, a zoom lens disposed inside the cam ring 264 may move in the optical axis direction based on the rotation of the cam ring 264. The speed reducer 262 may stop the rotation of the zoom motor 260 to stop the movement of the zoom lens at a point in time when the zoom lens has reached the desired position.

As described above, the imaging device 100 may perform the focusing operation and the zooming operation based on the amount of rotation and the direction or rotation of the focus operation ring 242 and the zoom operation ring 244 detected by the detection unit 230.

Based on the shooting scene, the imaging device 100 may be mounted on the UAV 10 or mounted on the gimbal 50 with the stabilizer 500 and held by hand. In this case, the imaging device 100 may be subject to vibration. Due to the vibration of the imaging device 100, the focus operation ring 242 and the zoom operation ring 244 may be rotated regardless of the intention of the user, thereby performing the focusing operation or the zooming operation.

Therefore, in the imaging device 100 of the present embodiment, when the imaging device 100 is connected to an object that satisfies a predetermined condition, a predetermined operation such as the focusing operation and the zooming operation of the operation unit such as the focus operation ring 242 and the zoom operation ring 244 with an inadvertent operation may be invalidated. As such, the imaging device 100 may be prevented from performing an unexpected operation due to the vibration of the imaging device 100.

Figure 7:
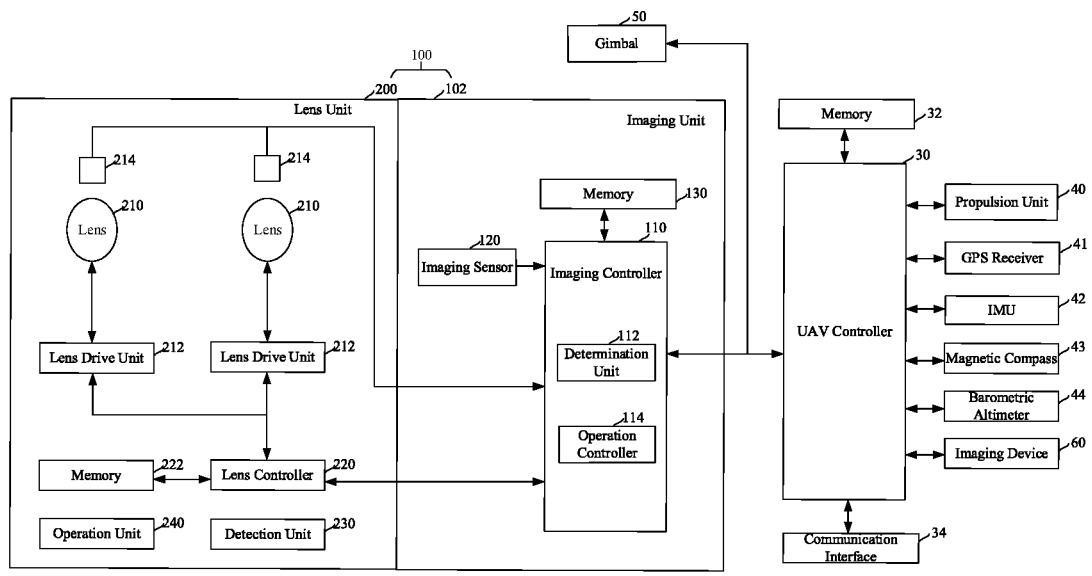
FIG. 7 is a diagram illustrating an example of functional blocks of the UAV.

FIG. 7 is a diagram illustrating an example of functional blocks of the UAV 10. The UAV 10 includes a UAV controller 30, a memory 32, a communication interface 34, a propulsion unit 40, a GPS receiver 41, an inertial measurement unit (IMU) 42, a magnetic compass 43, a barometric altimeter 44, a gimbal 50, an imaging device 60, and an imaging device 100.

The communication interface 34 can communicate with other devices such as the remote controller 300. In some embodiments, the communication interface 34 can receive instruction information including various instructions for the UAV controller 30 from the remote controller 300. The memory 32 may store programs needed for the UAV controller 30 to control the propulsion unit 40, the GPS receiver 41, the IMU 42, the magnetic compass 43, the barometric altimeter 44, the gimbal 50, the imaging device 60, and the imaging device 100. Further, the memory 32 may be a computer readable recording medium, and may include at least one of flash memories such as a SRAM, a DRAM, an EPROM, an EEPROM, and a USB memory. In some embodiments, the memory 32 may be disposed inside a UAV body 20. In other embodiments, the memory 32 may be configured to be detachable from the UAV body 20.

The UAV controller 30 can control the flight and imaging of the UAV 10 based on the program stored in the memory 32. The UAV controller 30 may include a microprocessor such as a central processing unit (CPU), a micro processing unit (MPU), or a microcontroller (MCU) or the like. In some embodiments, the UAV controller 30 may control the flight and imaging of the UAV 10 based on an instruction received from the remote controller 300 via the communication interface 34. The propulsion unit 40 can drive the UAV 10. In some embodiments, the propulsion unit 40 may include a plurality of rotors and a plurality of drive motors that rotate the plurality of rotors. Further, the propulsion unit 40 may rotate the plurality of rotors by using the plurality of drive motors based on the instruction from the UAV controller 30 to cause the UAV 10 to fly.

The GPS receiver 41 may receive a plurality of signals indicating the time of transmission from a plurality of GPS satellites. The GPS receiver 41 may calculate the position of the GPS receiver 41, that is, the position of the UAV 10 based on the received plurality of signals. The IMU 42 may detect the attitude of the UAV 10. In some embodiments, the IMU 42 may detect the acceleration in the three-axis direction of the front, rear, left, right, up, and down of the UAV 10, and the angular velocities of the three axes in the pitch, roll, and yaw directions. The magnetic compass 43 may detect the orientation of the heading of the UAV 10. The barometric altimeter 44 may detect the flying height of the UAV 10. In some embodiments, the barometric altimeter 44 may detect the air pressure around the UAV 10 and converts the detected air pressure to a height to detect the height.

The imaging device 100 includes an imaging unit 102 and a lens unit 200. The lens unit 200 may be an example of a lens device. The imaging unit 102 includes an image sensor 120, an imaging controller 110, and a memory 130. The imaging sensor 120 may include a CCD or a CMOS. The image sensor 120 may output image data of an optical image imaged by the plurality of lenses 210 to the imaging controller 110. The imaging controller 110 may include a microprocessor such as a central processing unit (CPU), a micro processing unit (MPU), or a microcontroller (MCU) or the like. In some embodiments, the imaging controller 110 may control the imaging device 100 based on an operation instruction from the imaging device 100 of the UAV controller 30. The memory 130 may be a computer readable recording medium, and may include at least one of flash memories such as a SRAM, a DRAM, an EPROM, an EEPROM, and a USB memory. The memory 130 can store programs needed for the imaging controller 110 to control the image sensor 120 or the like. In some embodiments, the memory 130 may be disposed inside a housing the imaging device 100. In other embodiments, the memory 130 may be disposed to be detachable the housing of the imaging device 100.

The lens unit 200 includes a plurality of lenses 210, a lens drive unit 212, a position sensor 214, a lens controller 220, a memory 222, a detection unit 230, and an operation unit 240. The plurality of lenses 210 may function as zoom lens and focus lens. In some embodiments, at least some or all of the plurality of lenses 210 may be configured to move along the optical axis. The lens unit 200 may be an interchangeable lens that can be detachably disposed with respect to the imaging unit 102. The position sensor 214 may detect the position of the plurality of lenses 210. The memory 222 may store identification information that identifies the lens unit 200. In some embodiments, the identification information may include the present or absence of the operation unit 240 operated by the manual operation. In some embodiments, the identification information may include the present or absence of the focus operation ring 242 and the zoom operation ring 244.

The operation unit 240 may be operated by an external force. The operation unit 240 may be, for example, the focus operation ring 242 and the zoom operation ring 244. However, the operation unit 240 is not limited to the focus operation ring 242 and the zoom operation ring 244. In some embodiments, the operation unit 240 may be an operation ring or an operation switch for instructing or setting an operation of the imaging device 100 other than focusing and zooming by an external force. The detection unit 230 may detect the operation state of the operation unit 240. In some embodiments, the detection unit 230 may include two photo interrupters 236 and the like as shown in FIG. 4. The lens drive unit 212 may be configured to move at least one or all of the plurality of lenses 210 along the optical axis. The lends controller 220 may be configured to drive the lens drive unit 212 based on a lens control instruction from the imaging unit 102, and move one or more lenses 210 in the optical axis direction. The lens control instruction may be, for example, a zoom control instruction and a focus control instruction. The lens controller 220 may control the movement of the one or more lenses 210 in the optical axis based on the lenses 210 detected by the position sensor 214.

In the imaging device 100 configured as described above, the imaging controller 110 may include a determination unit 112 and an operation controller 114 in order to prevent the imaging device 100 from performing an unexpected operation due to the vibration of the imaging device 100. In particular, the determination unit 112 may be configured to determine whether the imaging device 100 is connected to an object that satisfies a predetermined condition.

When the imaging device 100 is connected to an object that satisfied a predetermined condition, the operation controller 114 may invalidate the execution of a predetermined operation of the imaging controller 110 based on the operation state of the operation unit 240 detected by the detection unit 230. In some embodiments, the predetermined operation may be an operation of moving the lenses 210 included in the imaging device 100. When the imaging device 100 is connected to an object that satisfies a predetermined condition, the operation controller 114 may invalidate the focusing operation and the zooming operation performed by the imaging controller 110 based on the operation state of the operation unit 240 detected by the detection unit 230. Further, when the determination unit 112 determines that the imaging device 100 is not connected to an object that satisfies the predetermined condition, the operation controller 114 may activate the execution of the predetermined operation. In some embodiments, the invalidation may be a state in which the imaging controller 110 is unable to perform the predetermined operation based on the operation state of the operation unit 240. For example, the invalidation may be a state in which the imaging controller 110 is unable to perform the focusing operation and the zoom operation based on the operation state of the operation unit 240. In another example, the invalidation may be a state in which the predetermined control operation executed by the imaging controller 110 based on the operation state of the operation unit 240 is stopped. As such, the invalidate may be a state in which the imaging controller 110 does not accept the execution of the predetermined operation based on the operation state of the operation unit 240. In some embodiments, the validation may be a state in which the imaging controller 110 can perform the predetermined operation based on the operation state of the operation unit 240. The validation may be, for example, a state in which the imaging controller 110 can perform the focusing operation and the zoom operation based on the operation state of the operation unit 240. In another example, the validation may be a state in which the imaging controller 110 accepts the execution of the predetermined operation based on the operation state of the operation unit 240. In some embodiments, the operation controller 114 may be an example of a control unit.

In addition, the object that satisfies the predetermined condition may be an object in which the imaging device 100 is likely to vibrate. For example, when the imaging device 100 is mounted on a mobile object such as the UAV 10, the determination unit 112 may determine that the imaging device 100 is connected to an object that satisfies the predetermined condition. Further, when the imaging device 100 is mounted on a mobile object such as the UAV 10 that is in flight, the determination unit 112 may determine that the imaging device 10 is connected to an object that satisfies the predetermined condition. In some embodiments, the state in which the imaging device 100 is connected to an object that satisfies the predetermined condition may include a state in which the imaging device 100 is physically or electrically connected to an object that satisfies the predetermined condition. Further, the state in which the imaging device 100 is connected to an object that satisfies the predetermined condition may include a state in which the imaging device 100 is connected to an object that satisfies the predetermined condition via a wire or wireless.

When the imaging device 100 is mounted on the gimbal 50 that rotatably supports the imaging device 100, the determination unit 112 may determine that the imaging device 100 is connected to an object that satisfies the predetermined condition.

For example, when the imaging device 100 is mounted on the stabilizer 500, the gimbal 50 can operate in a first mode in which the rotation of the imaging device 100 is validated, and a second mode in which the rotation of the imaging device 100 is invalidated. On one hand, when the imaging device 100 is mounted on the gimbal 50 that operates in the first mode, the determination unit 112 may determine that the imaging device 100 is connected to an object that satisfies a predetermined condition. On the other hand, when the imaging device 100 is mounted on the gimbal 50 that operates in the second mode, the determination unit 112 may determine that the imaging device 100 is not connected to an object that satisfies a predetermined condition.

When the predetermined operation such as the focusing operation and the zooming operation is invalidated, the operation controller 114 may validate other predetermined operations executed by the operation controller 114 based on the operation state of the operation unit 240. The other predetermined operation may be operations performed on the imaging device 100 other than the focusing operation and the zooming operation. For example, other predetermined operations may be an exposure adjustment such as an adjustment of the shutter speed, an adjustment of the aperture, and an adjustment of the dimming rate by the dimming filter. Further, the other predetermined operations may be adjustments of the operating parameters of the gimbal 50 such as an adjustment of the rotational speed of the rotating shaft of the gimbal 50 and the like. Alternatively, the other predetermined operations may be adjustments of the operating parameters of the UAV 10 and the like. In some embodiments, the other predetermined operations may be adjustments to the operating parameters performed before the flight of the UAV 10, such as the setting of a flight mode that defines the flight speed, flight pattern, etc. of the UAV 10.

For example, when the imaging device 100 is mounted on a mobile object such as the UAV 10, the operation controller 114 may invalidate a predetermined operation and validate other predetermined operations. For example, when the imaging device 100 is mounted on the UAV 10, the operation controller 114 may invalidate the focusing operation and the zooming operation by the focus operation ring 242 and the zoom operation ring 244, and validate the setting of the flight mode by the manual operation of the focus operation ring 242 and the zoom operation ring 244. When the mobile object has started flying, the operation controller 114 may invalidate other predetermined operations. As such, it may be possible to prevent the flight mode of the mobile object such as the UAV 10 from being unexpectedly changed due to the vibration during flight.

Figure 8:
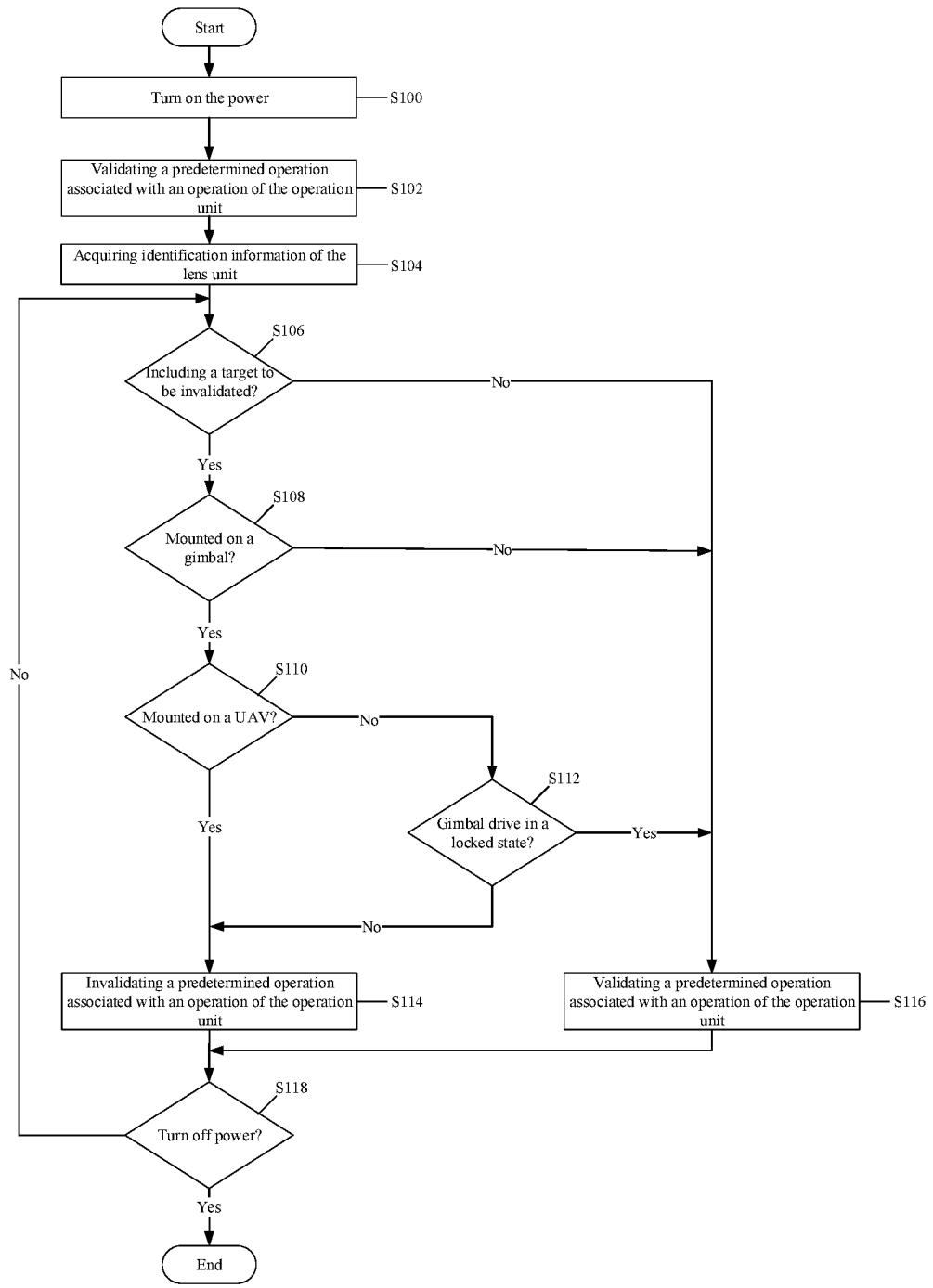
FIG. 8 is a flowchart illustrating an example of a sequence of a procedure for invalidating a predetermined operation.

FIG. 8 is a flowchart illustrating an example of a procedure for invalidating a predetermined operation. When a power of the imaging device 100 is turned on (S100), the imaging controller 110 may validate a predetermined operation such as a focusing operation and a zooming operation (S102). Subsequently, the imaging controller 110 may acquire the identification information of the lens unit 200 from the lens unit 200 (S104). The determination unit 112 may determine whether the lens unit 200 includes the detection unit 230 of a target to be invalidated based on the identification information (S106). On one hand, if the lens unit 200 does not include the detection unit 230 of the target to be invalidated, the imaging controller 110 may keep the predetermined operation as unchanged (S116).

On the other hand, if the lens unit 200 includes the detection unit 230 of the target to be invalidated, the determination unit 112 may determine that the imaging device 100 is mounted on the gimbal 50 (S108). If the imaging device 100 is not mounted on the gimbal 50, the imaging controller 110 may keep the predetermined operation as unchanged (S116).

If the imaging device 100 is mounted on the gimbal 50, the determination unit 112 may determine whether the imaging device 100 is disposed on the UAV 10 via the gimbal 50 (S110). If the imaging device 100 is disposed on the UAV 10, the operation controller 114 may invalidate the predetermined operation (S114).

If the imaging device 100 is not mounted on the UAV 10, the determination unit 112 may determine whether a drive of the gimbal 50 is in a locked state (S112). That is, the determination unit 112 may determine whether the gimbal 50 is operating is either the first mode in which the rotation of the imaging device 100 is validated or the second mode in which the rotation of the imaging device 100 is invalidated. On one hand, when the drive on the gimbal 50 is not in the locked state, that is, when the gimbal 50 is operating in the first mode, the operation controller 114 may invalidate the predetermined operation (S114). On the other hand, when the gimbal 50 is in the locked state, that is, when the gimbal 50 is operating in the second mode, the operation controller 114 may keep the predetermined operation as unchanged (S116). The imaging controller 110 may repeat the processing of S106 and its subsequent steps until the power of the imaging device 100 is turned off (S118). For example, if the imaging device 100 is detached from the gimbal 50, the operation controller 114 may switch the predetermined operation from the invalidated state to the validated state (S116).

As describe above, according to the imaging device 100 of the present embodiment, it may be possible prevent an unexpected operation of the operation unit 240 due to vibration of the imaging device 100 or the like. For example, when the imaging device including the focus operation ring 242 and the zoom operation ring 244 is mounted on the UAV 10 via the gimbal 50, even if the imaging device 100 vibrates due to the vibration of the UAV 10, it may be possible to prevent the focus operation ring 242 or the zoom operation ring 244 from rotating due to the vibration thereof. In addition, when the imaging device 100 is rotatably mounted on the stabilizer 500 via the gimbal 50, even if the imaging device 100 vibrates due to the vibration of the stabilizer 500, it may be possible to prevent the focus operation ring 242 or the zoom operation ring 244 from rotating due to the vibration thereof. As such, the unexpected execution of the focusing operation or the zooming operation associated with the vibration of the imaging device 100 may be prevented.

Figure 9:
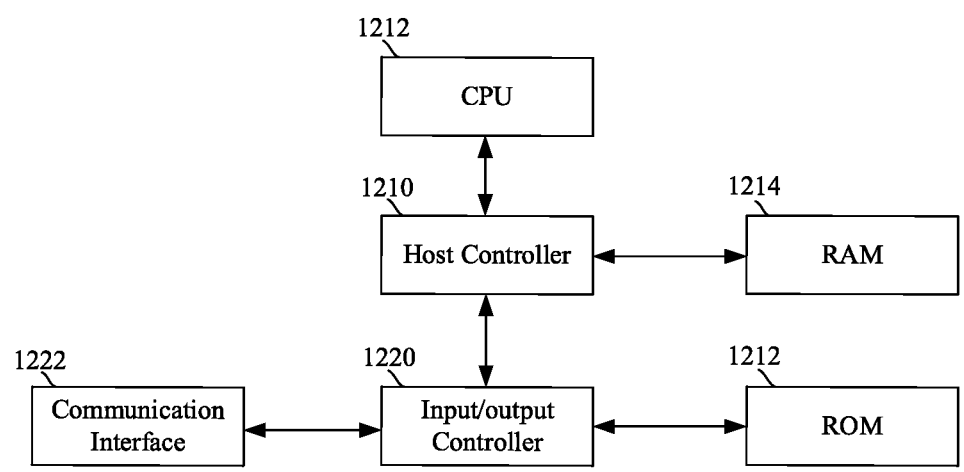
FIG. 9 is a diagram illustrating an example of a hardware configuration according to an embodiment of the present disclosure.

FIG. 9 is a diagram illustrating an example of a computer 1200 that may be configured to implement in whole or in part of the various aspects of the present disclosure. The program installed in the computer 1200 may be configured to cause the computer 1200 to perform the related operations of the device or one or more parts of the device according to the embodiments of the present disclosure. Alternatively, the program may cause the computer 1200 to execute the operation or one or more parts of the operation. The program may cause the computer 1200 to execute the process or the steps of the process related to the embodiments of the present disclosure. The program can be executed by a CPU 1212 in order for the computer 1200 to execute a number of or all of the specific specified operations associated with the flowcharts and block diagrams of the present disclosure.

As shown in FIG. 9, the computer 1200 includes the CPU 1212 and RAM 1214. The CPU 1212 and the RAM 1214 are connected to each other by a host controller 1210. The computer further includes a communication interface 1222, an input/output unit. The communication interface 1222 and the input/output unit are connected to the host controller 1210 via an input/output controller 1220. The computer 1200 further includes ROM 1230. The CPU 1212 may be configured to operation in accordance with the program stored in the ROM 1230 and the RAM 1214, thereby controlling the respective units.

The communication interface 1212 may communicate with other electronic devices over a network. The hard disk drive can store programs and data for use by the CPU 1212 within the computer 1200. The ROM 1230 may store a boot program or the like executed by the computer 1200 at the time of boot up and/or a program dependent on the hardware of the computer 1200. The program may be provided by a computer readable recording medium such as a CD-ROM, a USB memory, or an IC card. Further, the program may be installed in the RAM 1214 or the ROM 1230, which may be an example of the computer readable recording medium, and executed by the CPU 1212. The information processing described within these programs may be read by the computer 1200 to cause cooperation between the programs and the various types of hardware resources. In some embodiments, device or method may be constructed by realizing the operation or processing of the information by using the computer 1200.

For example, when the communication is performed between the computer 1200 and an external device, the CPU 1212 can execute a communication program loaded on the RAM 1214 and instruct the communication interface 1222 to perform a communication processing based on the processing described in the communication program. Under the control of the CPU 1212, the communication interface 1212 may read the transmission data stored in a transmission buffer included in the recording medium such as the RAM 1214 or the USB memory, then transmit the read transmission data to the network, or write the received data received through the network to a reception buffer or the like included in the recording medium.

Moreover, the CPU 1212 may read all or a part of files or databases stored in an external recording medium such as a USB memory into the RAM 1214 and perform various types of processing on the data on the RAM 1214. Subsequently, the CPU 1212 may write the processed data back to the external recording medium.

Various types of information such as various types of programs, data, tables, and databases can be stored in a recording medium and subjected to information processing. The CPU 1212 can perform various types of processing on the data read from the RAM 1214 and write the results back into the RAM 1214. In some embodiments, the various types of processing may include various types of operations, information processing, conditional determinations, conditional branches, unconditional branches, retrieval/replacement of information, etc. specified by the instruction sequence of the program as described elsewhere in the present disclosure. In addition, the CPU 1212 can retrieve information in a file, a database, and the like in the recording medium. For example, when multiple entries having an attribute value of a first attribute related to an attribute value of a second attribute are stored in the recording medium, the CPU 1212 can retrieve an entry corresponding to the condition specified by the attribute value of the first attribute from the multiple entries and read the attribute value of the second attribute stored in the entry, thereby obtaining the attribute value of the second attribute related to the first attribute that satisfies the predetermined condition.

The program or software modules described above can be stored on the computer 1200 or in a computer readable storage medium similar to the computer 1200. In addition, a recording medium such as a hard disk or a RAM included in a server system connected to a dedicated communication network or the Internet can be used as the computer readable storage medium. As such, the program can be provided to the computer 1200 through the network.

The technical solutions of the present disclosure have been described by using the various embodiments mentioned above. However, the technical scope of the present disclosure is not limited to the above-described embodiments. It should be obvious to one skilled in the art that various modifications and improvements may be made to the embodiments. It should also obvious from the scope of claims of the present disclosure that thus modified and improved embodiments are included in the technical scope of the present disclosure.

As long as the "before," "previous," etc. are not specifically stated, and as long as the output of the previous processing is not used in the subsequent processing, the execution order of the processes, sequences, steps, and stages in the devices, systems, programs, and methods illustrated in the claims, the description, and the drawings may be implement in any order. For convenience, the operation flows in the claims, description, and drawing have been described using terms such as "first," "next," etc., however, it does not mean these steps must be implemented in this order.

DESCRIPTION OF THE REFERENCE NUMERALS

10 UAV
20 UAV body
30 UAV controller
32 Memory
34 Communication interface
40 Propulsion unit
41 GPS receiver
42 IMU
43 Magnetic compass
44 Barometric altimeter
50 Gimbal
60 Imaging device
100 Imaging device
102 Imaging unit
110 Imaging controller
112 Determination unit
114 Operation controller
120 Image sensor
130 Memory
200 Lens unit
210 Lenses
212 Lens drive unit
214 Position sensor
220 Lens controller
222 Memory
230 Detection unit
232 Annular portion
234 Protrusions
236 Photo interrupter
240 Operation unit
242 Focus operation ring
244 Zoom operation ring
250 Interchangeable lens
252 Focus motor
254 Focus lens unit
260 Zoom motor
262 Speed reducer
264 Cam ring
300 Remote controller
500 Stabilizer
502 Handheld unit
1200 Computer
1210 Host controller
1212 CPU
1214 RAM
1220 Input/output controller
1222 Communication interface
1230 ROM

What is claimed is:

1. A control device for controlling an imaging device, comprising:
an operation unit configured to be operated by an external force;
a detection unit configured to detect an operation state of the operation unit; and
a processor configured to execute a program to:
perform a predetermined operation based on the operation state of the operation unit;
determine whether the imaging device is connected to an object satisfying a condition by determining whether the imaging device is mounted on a support mechanism configured to rotatably support the imaging device, wherein:
the support mechanism is configured to operate in a first mode in which a rotation of the imaging device is validated and a second mode in which the rotation of the imaging device is invalidated; and
the imaging device is determined to be connected to the object satisfying the condition when the imaging device is mounted on the support mechanism operating in the first mode; and
invalidate an execution of the predetermined operation performed by the processor based on the operation state of the operation unit when the processor determines that the imaging device is connected to the object satisfying the condition.

2. The control device of claim 1, wherein the processor validates the execution of the predetermined operation when the processor determines that the imaging device is not connected to the object satisfying the condition.

3. The control device of claim 1, wherein the object satisfying the condition includes a mobile device.

4. The control device of claim 1, wherein the object satisfying the condition includes a mobile device in flight.

5. The control device of claim 1, wherein the processor determines the imaging device is not connected to the object satisfying the condition when the imaging device is mounted on the support mechanism operating in the second mode.

6. The control device of claim 1, wherein the predetermined operation includes an operation of moving a lens disposed in the imaging device.

7. The control device of claim 1, wherein the processor is further configured to execute the program to validate another predetermined operation executed by the processor based on the operation state of the operation unit when the processor invalidates the predetermined operation.

8. The control device of claim 7, wherein the processor is further configured to execute the program to invalidate the predetermined operation and validate another predetermined operation when the imaging device is mounted on a mobile device.

9. The control device of claim 8, wherein the processor invalidates the predetermined another operation when the mobile device has started flying.

10. The control device of claim 1, wherein the operation unit includes at least one of a focus operation ring, a zoom operation ring, an operation ring, or an operation switch.

11. The control device of claim 1, wherein the detection unit includes a photo interrupter.

12. The control device of claim 1, wherein the support mechanism includes a gimbal.

13. An imaging device comprising the control device of claim 1.

14. An imaging system comprising the imaging device of claim 13.

15. A mobile object movable corresponding to a movable imaging system, wherein the movable imaging system has an imaging device including a control device and a support mechanism configured to rotatably support the imaging device, the control device including:
an operation unit being operated by an external force; and
a detection unit configured to detect an operation state of the operation unit;
a processor configured to execute a program to:
perform a predetermined operation based on the operation state of the operation unit;
determine whether the imaging device is connected to an object satisfying a condition by determining whether the imaging device is mounted on a support mechanism configured to rotatably support the imaging device, wherein:
the support mechanism is configured to operate in a first mode in which a rotation of the imaging device is validated and a second mode in which the rotation of the imaging device is invalidated; and
the imaging device is determined to be connected to the object satisfying the condition when the imaging device is mounted on the support mechanism operating in the first mode; and
invalidate an execution of the predetermined operation performed by the processor based on the operation state of the operation unit when the processor determines that the imaging device is connected to the object satisfying the condition.

16. The mobile object of claim 15, wherein the mobile object includes an unmanned aerial vehicle.

17. A control method for controlling an imaging device:
performing a predetermined operation based on an operation state of an operation unit;
determining whether the imaging device is connected to an object satisfying a condition by determining whether the imaging device is mounted on a support mechanism configured to rotatably support the imaging device, wherein:
the support mechanism is configured to operate in a first mode in which a rotation of the imaging device is validated and a second mode in which the rotation of the imaging device is invalidated; and
the imaging device is determined to be connected to the object satisfying the condition when the imaging device is mounted on the support mechanism operating in the first mode; and
invalidating an execution of the predetermined operation performed by a program based on the operation state of the operation unit when the imaging device is connected to the object satisfying the condition.

18. A control device for controlling an imaging device, comprising:
an operation unit configured to be operated by an external force;
a detection unit configured to detect an operation state of the operation unit; and
a processor configured to execute a program to:
perform a predetermined operation based on the operation state of the operation unit;
invalidate an execution of the predetermined operation performed by the processor based on the operation state of the operation unit when the imaging device is connected to a mobile device;
in response to the processor invalidating the predetermined operation, validate another predetermined operation executed by the processor based on the operation state of the operation unit; and
in response to the mobile device having started flying, invalidate the predetermined another operation.

* * * * *